United States Patent [19]
Dettmar

[11] Patent Number: 5,995,572
[45] Date of Patent: Nov. 30, 1999

[54] METHOD FOR MEASURING FREQUENCY SHIFT IN DIGITAL COMMUNICATIONS USING SYNCHRONIZATION SEQUENCE AND CHANNEL STEP RESPONSE

[75] Inventor: Uwe Dettmar, Tägerig, Switzerland

[73] Assignee: Ascom Tech AG, Bern, Switzerland

[21] Appl. No.: 08/802,253

[22] Filed: Feb. 19, 1997

[30] Foreign Application Priority Data

Feb. 19, 1996 [CH] Switzerland ............................ 0430/96

[51] Int. Cl.$^6$ ...................................................... H04L 7/00
[52] U.S. Cl. ............................................................ 375/368
[58] Field of Search .................................... 375/368, 366, 375/365, 364, 362, 354, 373, 375, 340, 343, 344, 231

[56] References Cited

U.S. PATENT DOCUMENTS 5,233,632  8/1993  Baum et al. ............................ 375/368

*Primary Examiner*—Stephen Chin
*Assistant Examiner*—Albert Park

[57] ABSTRACT

In a process for demodulation of a received signal that contains, in addition to data to be transmitted, a preset synchronization sequence, the following is done to estimate a frequency shift. At least two nonoverlapping partial sequences of the synchronization sequence are picked off. Using a least-square process, the coefficients of the channel step response at each observation window are determined. The frequency shift, in the form of a phase rotation per symbol, is then estimated.

9 Claims, 4 Drawing Sheets

METHOD FOR MEASURING FREQUENCY SHIFT IN DIGITAL COMMUNICATIONS USING SYNCHRONIZATION SEQUENCE AND CHANNEL STEP RESPONSE

BACKGROUND OF THE INVENTION

1. Field of the Invention

The invention relates to a process for demodulation of a receiving signal that contains, besides the data to be transmitted, a preset synchronization sequence. The invention relates further to an arrangement for performing the process.

2. Description of the Background Art

In modern data transmission processes, a sequence, known in advance, with largely ideal correlation properties is often used as preamble. This makes it possible to have frame and bit synchronization, an estimate of the channel coefficients and possibly the training of an equalizer.

In practice, because of component tolerances, a frequency shift between the local oscillators in sender and receiver repeatedly occurs. If this frequency shift is not taken into account during demodulation, a noticeable degradation in the performance of data detection must be dealt with. Thus various processes for estimating frequency shift have already been proposed. Known, for example, is the use of a nonlinearity for MSK signals (U. Lambrette and H. Meyr, "Two timing recovery algorithm for MSK," IEEE 1994 p 1155/9), the use of an exponentiation process in PSK signals (S. N. Crozier, "Theoretical and simulated performance for a novel frequency estimation technique," Communication Research Center Ottawa, pp 423–428) or the use of an optimal synchronization sequence that transmits the carrier signal with the help of a sequence of constant data (Oliver C. Mauss, Stefan Feuchtinger, "Low complexity digital down conversion and frequency correction scheme for burst mode digital radio," IEEE 1993, p 621–625).

SUMMARY OF THE INVENTION

The object of the invention is to indicate a process of the above-mentioned type that is not limited to a certain signal format and that avoids the nonlinearities that are problematic during disturbances in known processes.

According to the invention, the solution consists in doing the following for estimating a frequency shift:

a) picking off at least two nonoverlapping partial sequences of the synchronization sequence, b) detecting, with the help of a least-square process, coefficients for one channel step response in each case for both partial sequences, and c) estimating the frequency shift, in the form of a phase rotation per symbol, according to equation I.

An essential advantage of the invention consists in that nonideal synchronization sequences can also be worked into its correlation properties. The synchronization sequence is namely often preset by a technical standard that is to be taken into account when implementing a signal receiver. It is also to be noted that a synchronization sequence as a whole can have thoroughly ideal autocorrelation properties, but that this is not true for shorter segments (partial sequences) of such an ideal sequence.

Preferably, for reduction purposes, frequency shift $\xi$ will be calculated according to equation VI. The calculation expenditure is less than with the estimate according to formula I. A considerable performance degradation compared to the estimation whose calculation is more expensive does not have to be assumed here if the autocorrelation properties of the partial sequences do not deviate too much from the ideal case. In one application in which the choice of the synchronization sequence is open, the partial sequences, in the sense of ideal autocorrelation properties, can be established or picked off. The estimate according to formula VI (or XI) will then be completely satisfactory.

With minimal additional calculation expenditure, channel step response h can also be determined. According to the invention, equations VII–VIII are used for that purpose. A reduction that is suitable for partial sequences with good (especially ideal) correlation properties results from the channel estimate according to formula IX (or XII).

In both calculations of the channel step response, another reduction in the calculation expenditure can be achieved if knowledge of the phase of h is not needed. This is the case especially if the subsequent data detection is performed with an equalizer. It can then advantageously be assumed that channel step response h corresponds to step response h[1] detected in the second window. The beginning of the phase shift (caused by the frequency shift) is then situated in the center of the observation window. In other words, the initial phase formula $[(N+M)/2+i_1]\xi$ is included in the estimated channel step response and is compensated for by the equalizer. From this results, besides the complexity reduction, the following advantage: the estimation error of the frequency shift, expressed as a phase offset between adjacent received symbols, accumulates until the moment of phase correction. The acceptance of the beginning of the phase shift in the center of the second window thus reduces the value of the accumulated estimation error.

The partial sequences preferably have a length in the range of several tens of symbols (e.g., 50): The corresponding observation windows can in principle be directly adjacent to one another, but preferably are at an interval that is, e.g., at least as long as the length of a partial sequence. The larger the observation window, the smaller the disruptive influence of noise.

For the unambiguousness of $\xi$ it must be true that $-\pi/\xi < i_1 - i_0 < \pi/\xi$. If the phase shift and interval of the observation windows are so large that there is phase ambiguity, additional observation windows can be inserted between the windows beginning at $i_0$ and $i_1$ that make it possible to track the accumulated phase change. This way the sign of $\xi$ and the number of multiples of $2\pi$ that are possibly contained in $(i_1-i_0)\xi$ can be determined.

An arrangement for performing the process according to the invention has a) a storage device for the preset symbols of the partial sequences, b) a buffer storage device for the symbols transmitted in the received signal, c) a calculation unit for determining coefficients $\Theta[0]$ and $\Theta[1]$ corresponding to the observation windows, d) a time delay element (in particular a shift register) to delay coefficients $\Theta[0]$ according to the temporal interval of the observation windows and e) a calculation circuit to determine the frequency shift according to equation I.

For nonideal partial sequences, a storage device for the values of matrix $\Phi$ that can be calculated in advance and a calculation circuit for evaluating equation II are additionally used. Further, to perform the described, preferred process, the corresponding formulas can simply be programmed in.

Other advantageous embodiments and combinations of features come out from the detailed description below and the totality of the claims.

BRIEF DESCRIPTION OF THE DRAWINGS

The drawings used to explain the embodiments show.

In the figures, the same components are given the same reference symbols.

DETAILED DESCRIPTION OF THE PREFERRED EMBODIMENTS

Figure 1:
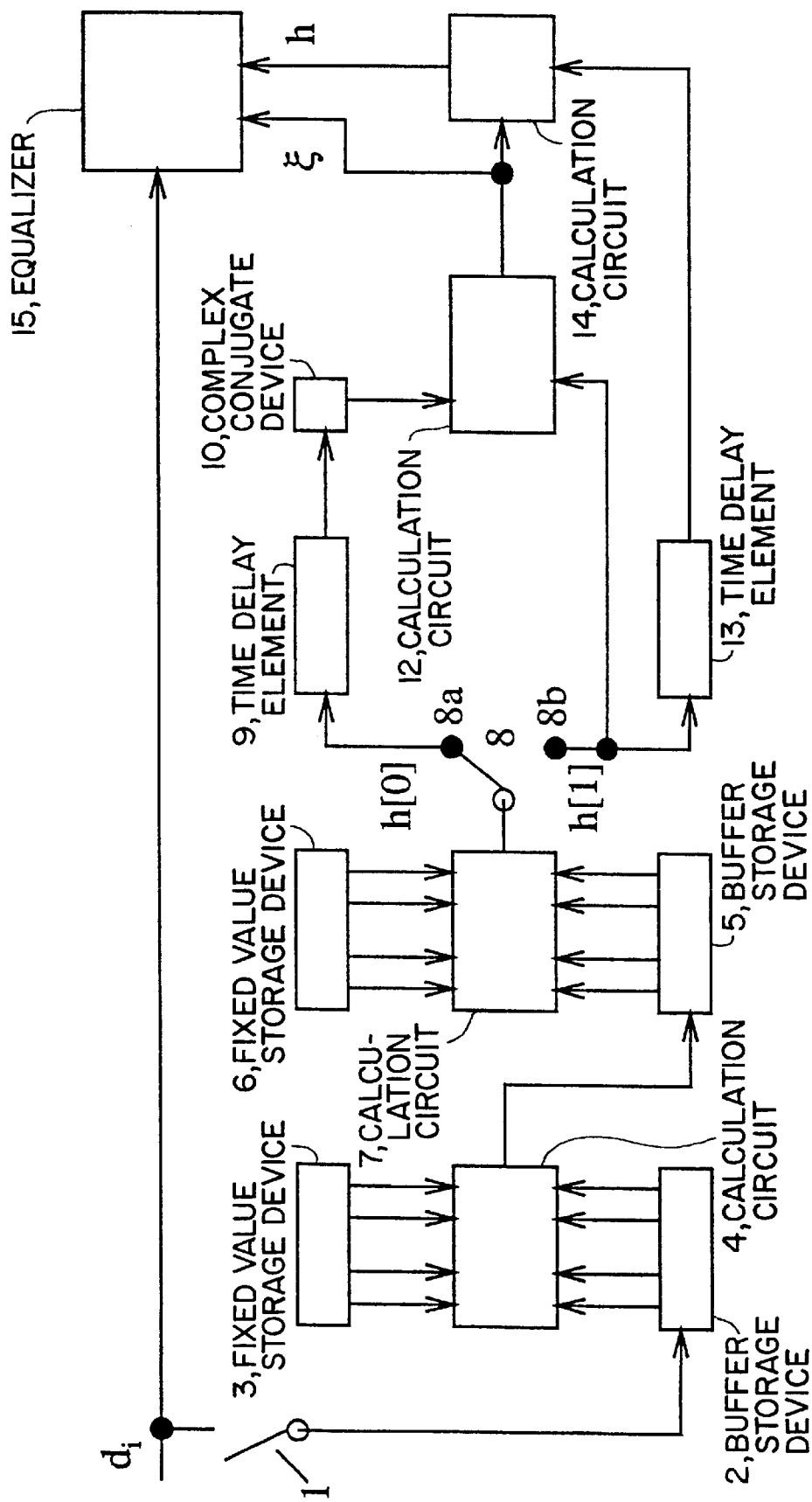
FIG. 1, a block diagram of a receiver according to the invention with estimation of the frequency shift and of the channel step response.

FIG. 1 shows as an example a block diagram of a receiver according to the invention (baseband representation). The detection of received symbols $d_1$ is performed, e.g., with an equalizer 15 or another detection circuit known in the art. The actual data are given by a so-called synchronization sequence. Involved here is a preset sequence of symbols that are known in advance to the receiver. The synchronization sequence has, e.g., a length of 400 symbols. According to the invention, e.g., two partial sequences of the synchronization sequence are sampled with a switch 1. The partial sequences define corresponding observation windows. They may not overlap one another.

For the description below the following convention is assumed: The symbols of the synchronization sequence carry index i that goes, e.g., from 1–400 (total length of the synchronization sequence). The first partial sequence begins at an index io that is determined in advance and goes to $i_0+N-1$. Accordingly, the second partial sequence goes from $i_1$ to $i_1+N-1$. N thus designates the length of both partial sequences or observation windows.

Figure 4:
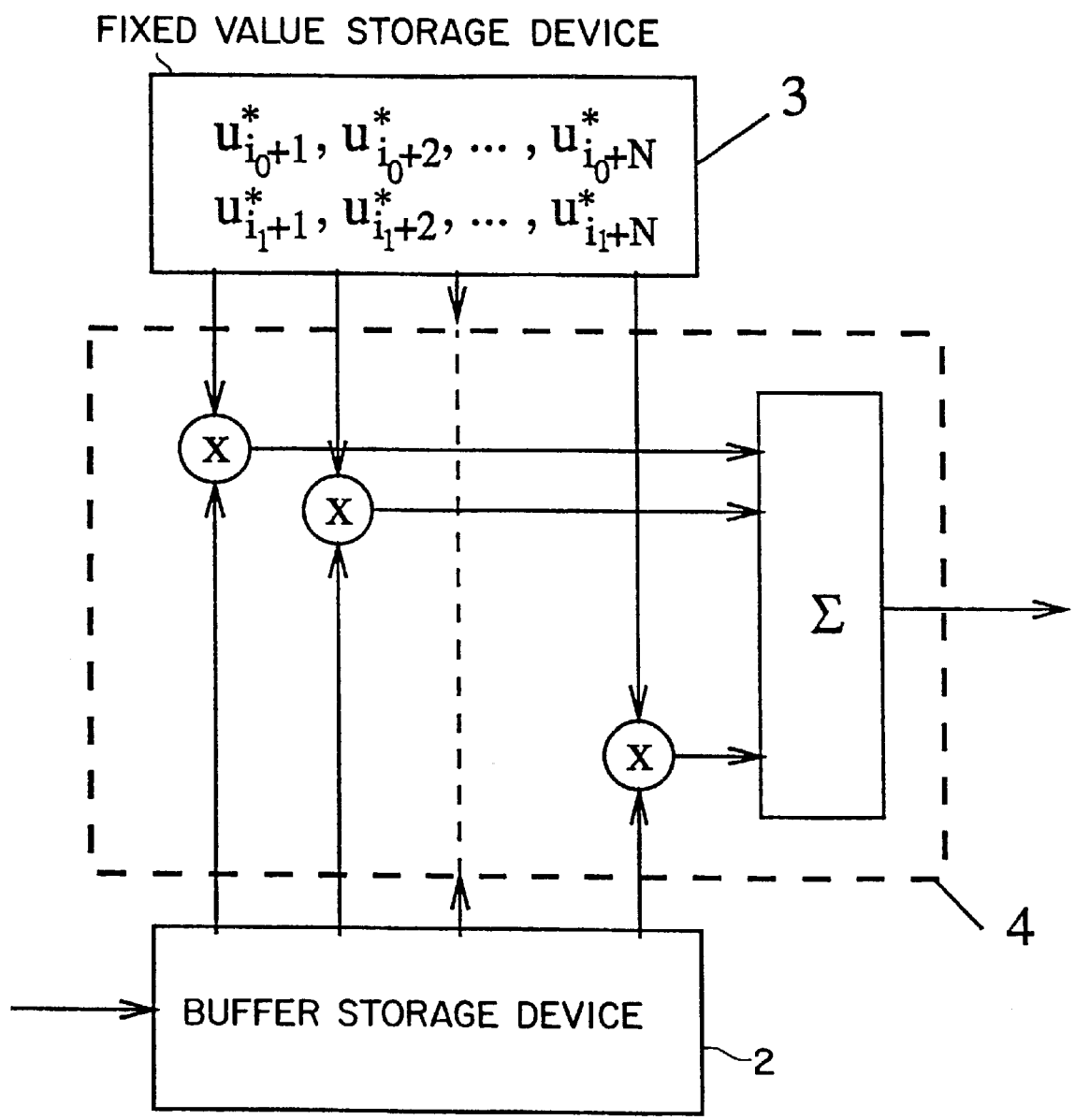

As can also be seen in FIG. 4, sampled symbols $d_1$ are placed in a buffer storage device 2. A fixed value storage device 3 contains symbol values $u^*_{i_0+1}$ to $u^*_{i_0+N}$, known in advance, of the first partial sequence and values $u^*_{i_1+1}$ to $u^*_{i_1+N}$ of the second. Formula V is now evaluated with calculation circuit 4. M designates the number of (considered) coefficients of the channel step response. Thus the result is two vectors $\Theta^*[0]$ and $\Theta^*[1]$. $\Theta^*[0]$ here designates the values belonging to first sampling window [$i_0$] and $\Theta^*[1]$ those belonging to second sampling window [$i_1$]. The star stands for conjugate-complex.

Figure 2:
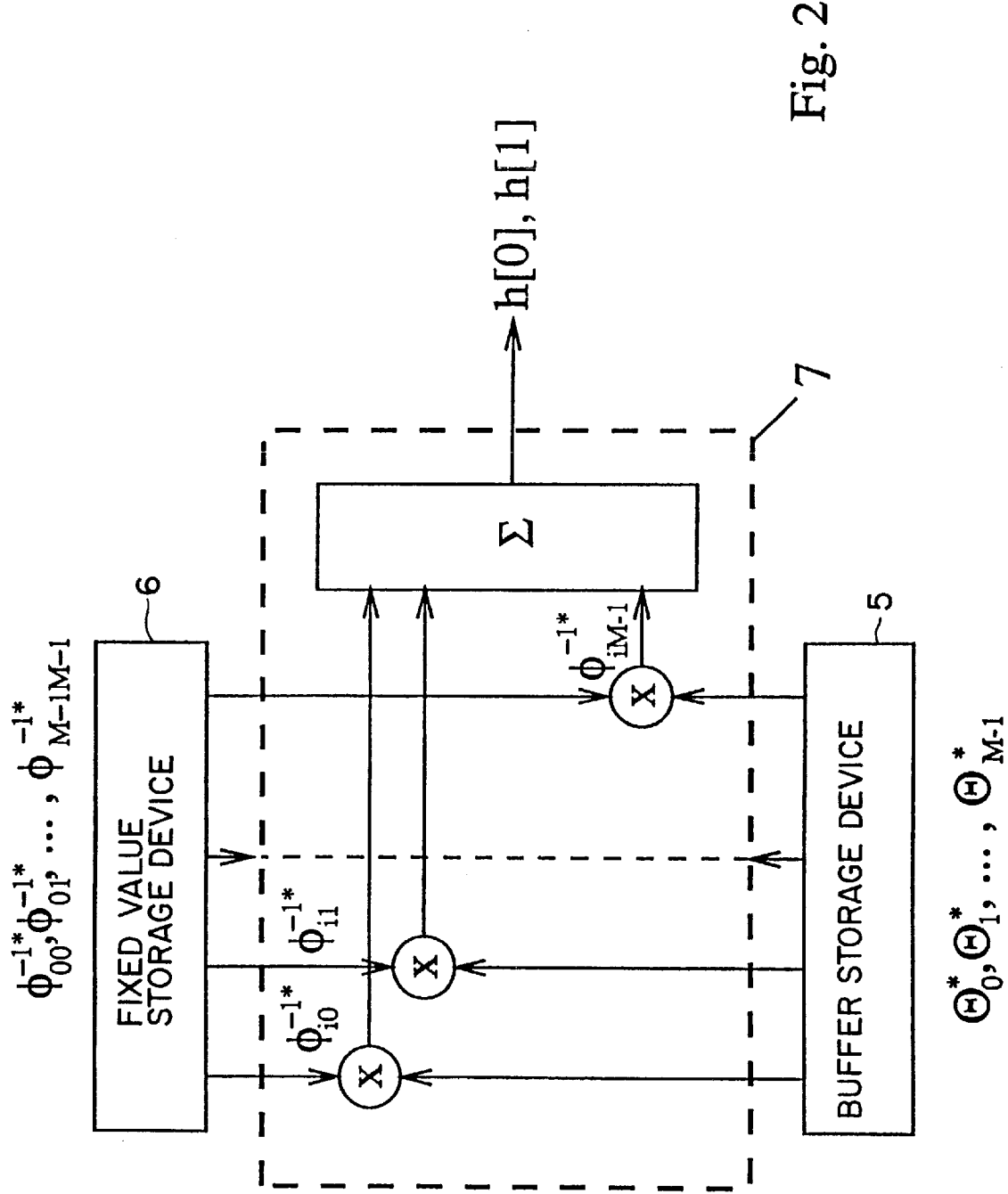
FIG. 2, a block diagram of a calculation circuit used additionally for nonideal synchronization sequences, FIG. 3, a block diagram for determining the frequency shift, and FIG. 4, a block diagram of a circuit arrangement for calculating vector size $\Theta^*$ for the observation windows.

In the next stage (see also FIG. 2) coefficients h[0] and h[1] of the channel step response in both observation windows is calculated. For this purpose, values $\Theta^*[0]$ and $\Theta^*[1]$ are put in a buffer storage device 5. A fixed value storage device 6 contains matrix values $\Phi_{l,k}$ according to equation III. As already mentioned, symbols $u_i$ of the partial sequences are known in advance, so that named matrix values $\Phi_{l,k}$ can be calculated when implementing the receiving circuit. Coefficient vector h for both observation windows can thus be calculated from inverted matrix $\Phi^{-1}*$ according to equation II with a calculation circuit 7.

Figure 3:
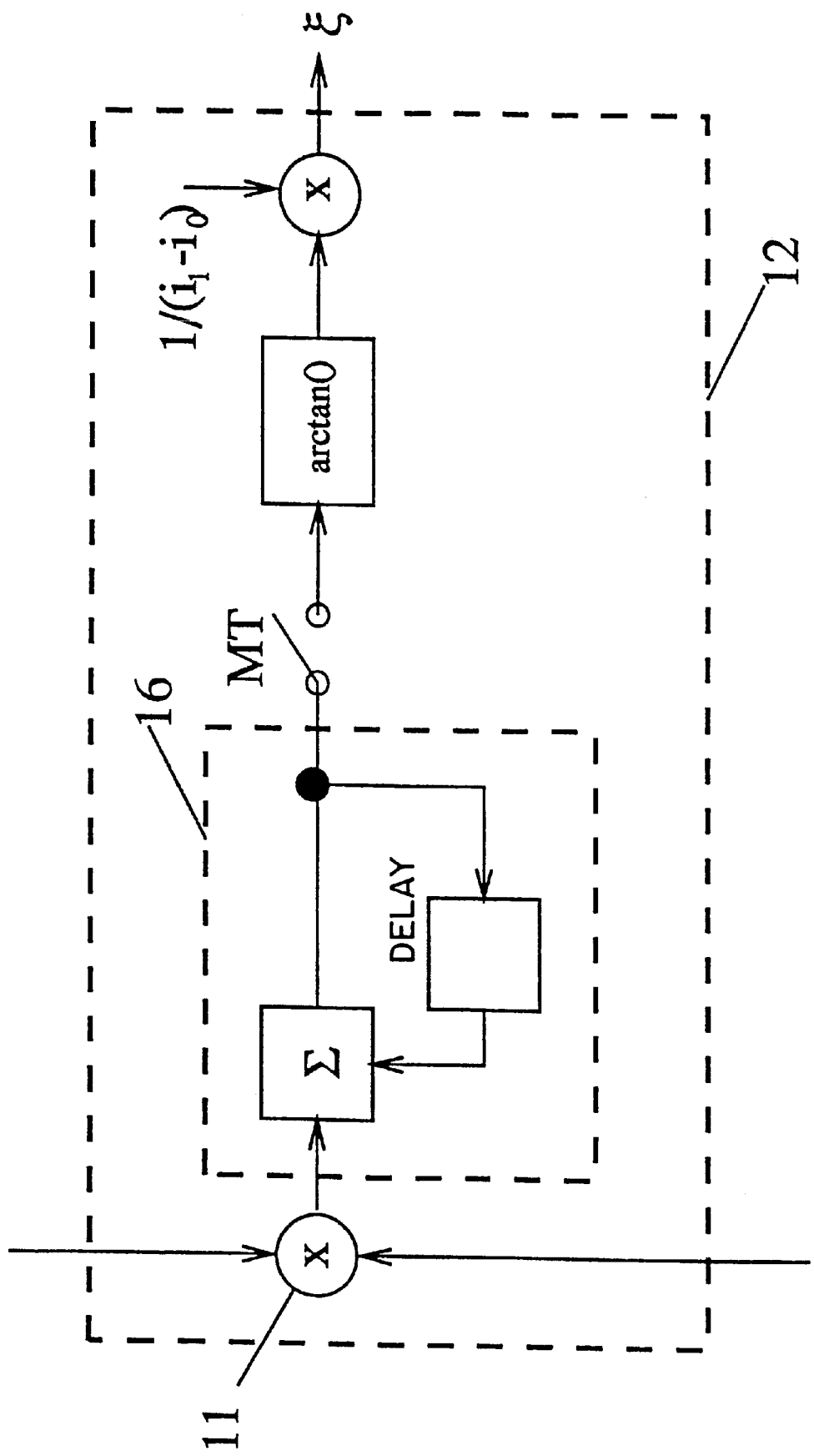

A changeover switch 8 (on the output side of calculation circuit 7) is first in a switch position 8a and transfers all coefficients h[0] to a time delay element 9. Thereafter it is switched to switch position 8b, in which coefficients h[1] are given to multiplier 11 (see FIG. 3) and to a time delay element 13. Time delay element 9 retains the coefficients for a period $(i_1-i_0)T$ (T=symbol duration). Then the coefficients of the first sampling window are transferred by a circuit 10 that forms the conjugate-complex values to multiplier 11 in calculation circuit 12. M values are summed by an accumulator 16. The result is a complex value from which the argument (e.g., with the inverse tangent function) is determined. After a multiplication with constant value $1/(i_1-i_0)$, the result is the sought phase rotation $\xi$ per symbol (frequency shift). Thus equation I was evaluated with calculation circuit 12.

Formulas I to V were evaluated with the above-described parts of the circuit arrangement.

To determine an estimate of channel step response h, coefficients h[1] are delayed with a time delay element 13 by M times symbol duration T. Finally, in a calculation circuit 14, coefficient vector h is determined according to equations VII and VIII on the basis of the estimated frequency shift.

The embodiment thus described is suitable in principle for any synchronization sequences. For partial sequences with good or even ideal autocorrelation properties, the operations can be simplified. Briefly, the intermediate step with calculation circuit 7 is eliminated. Mathematically speaking, then only the evaluation of formulas VI and IX are involved.

Alternatively, then also correlation coefficients $R_x$ can be determined according to formula (X), to calculate from it phase rotation $\xi$ and the coefficients of impulse response h according to formulas (XI) and (XII).

The first described embodiments differ from the latter described embodiment in that in one case the sequence contained in storage device 3 is longer and, in the other case, the one contained in storage device 2 is longer. In each case the shorter sequence is "shifted" by the longer one. Thus the calculation of correlation coefficients $R_k$ of buffer storage device 2 can be dispensed with.

Calculation circuit 14 can be dispensed with if it suffices to know the relative size of the coefficients of the channel step response. Equalizer 15 can also calculate, e.g., a corresponding constant phase shift of the symbols.

Buffer storage device 2 can be made, e.g., as a simple shift register. I.e., received symbols $d_1$ are, for correlation purposes, shifted by the stored partial sequences.

It is advantageous if the observation windows are selected so that $\Phi[0]=\Phi[1]$. It is to be understood that in equation I for instance, the symbol T represents the transposition of th vector or matrix elements. It is also to be understood that in equation VI for instance, the symbol H represents the Hermite conjugation which is the transposition and complex conjugate of vector and matrix elements.

The process according to the invention is performed advantageously by a special DSP (digital signal processor).

In summary it is to be noted that the invention creates a process for estimating frequency shift and, alternatively, channel step response, which is essentially independent from the signal format. The application domain of this process is correspondingly broad.

Formulas:

$$\xi = \frac{1}{i_1 - i_0} \arg\{h^T(1)h^*(0)\} \qquad \text{I}$$

$$h^* = \Phi^{-1}\Theta \qquad \text{II}$$

-continued $$\Phi_{t,k} = \sum_{i=M}^{N} u_{i-k} u_{i-t}^*, 0 \leq t, k \leq M - 1 \qquad \text{III}$$

$$\Theta = (\Theta_0, \Theta_{-1}, \ldots, \Theta_{-(M+1)})^T \qquad \text{IV}$$

$$\Theta_{-k} = \sum_{i=M}^{N} u_{i-k} d_i^*, 0 \leq k \leq M - 1 \qquad \text{V}$$

$$\xi = \frac{1}{i_1 - i_0} \arg\{\Theta^H(1)\Theta(0)\} \qquad \text{VI}$$

$$h = h(0)\exp(-j i_1 \xi)(N - M + 1)/K^* \qquad \text{VII}$$

$$K = \frac{\exp(-j(N+1)\xi) - \exp(-jM\xi)}{\exp(-j\xi) - 1} \qquad \text{VIII}$$

$$h = \Theta^*(1)\exp(-j i_i \xi)/K^* \qquad \text{IX}$$

$$R_k = \sum_{i=M}^{N} u_i d_{i+k}^*, 0 \leq k \leq M - 1 \qquad \text{(X)}$$

$$\xi = \frac{1}{i_1 - i_0} \arg\{R^H[1]R[0]\} \qquad \text{(XI)}$$

$$h = R^*[1]\exp(-j i_i \xi)/K^* \qquad \text{(XII)}$$

I claim:

1. A process for demodulation of a received signal that contains, in addition to data to be transmitted, a preset synchronization sequence, characterized in that, to estimate a frequency shift ξ,
   a) at least two nonoverlapping partial sequences ($d_{i0}$ to $d_{i0+N}$ and $d_{i1}$ to $d_{i1+N}$) of the synchronization sequence are picked off,
   b) using a least-square process, coefficients h[0], h[1] are determined for one channel step response in each case for both partial sequences ($d_{i0}$ to $d_{i0+N}$ and $d_{i1}$ to $d_{i1+N}$), and
   c) frequency shift ξ, in the form of a phase rotation per symbol, is estimated as:

$$\xi = \frac{1}{i_1 - i_0} \arg\{h^T(1) h^*(0)\},$$

wherein $i_1$ and $i_0$ are indexes and $h^T(1)$ represents a transposition of coefficient vector h(1).

2. The process according to claim 1, wherein coefficients h of the channel step response are estimated as:

$$h = h(0) \exp(-j i_i \xi)(N-M+1)/K^*,$$

wherein N designates a length of both partial sequences, M designates a number of coefficients of the channel step response and K is represented as $$K = \frac{\exp(-j(N+1)\xi) - \exp(-jM\xi)}{\exp(-j\xi) - 1}.$$

3. The process according to claim 1, wherein coefficients h of the channel step response are estimated as:

$$h = \Theta^*(1) \exp(-j i_i \xi)/K^*,$$

wherein Θ(1) is a delay coefficient according to a temporal interval of an observation window of the partial sequences and K is represented as $$K = \frac{\exp(-j(N+1)\xi) - \exp(-jM\xi)}{\exp(-j\xi) - 1},$$

wherein N designates a length of both partial sequences and M designates a number of coefficients of the channel step response.

4. The process according to claim 1, wherein three or more overlapping partial sequences are picked off.

5. An arrangement for performing the process for demodulation according to claim 1, comprising a storage device and a calculation circuit provided for evaluating h as:

$$h^* = \Phi^{-1} \Theta,$$

wherein Θ is a delay coefficient and $$\Phi_{t,k} = \sum_{M}^{N} u_{i-k} u_{i-t}^*,$$

wherein $0 \leq t$ and $k \leq M-1$, M designates a number of coefficients for the channel response and u are symbol values.

6. A process for demodulation of a received signal that contains, besides data transmitted, a preset synchronization sequence characterized in that, to estimate a frequency shift ξ,
   a) at least two nonoverlapping partial sequences ($d_{i0}$ to $d_{i0+N}$ and $d_{i1}$ to $d_{i1+N}$) of the synchronization sequence are picked off,
   b) using a least-square process, delay coefficients $\Theta^H(1)$ and Θ(0) are determined for one channel step response in each case for both partial sequences ($d_{i0}$ to $d_{i0+N}$ and $d_{i1}$ to $d_{i1+N}$), wherein $\Theta^H(1)$ represents a transposition and complex conjugate of Θ(1), and
   c) frequency shift ξ, in the form of a phase rotation per symbol, is estimated for reduction purposes as:

$$\xi = \frac{1}{i_1 - i_0} \arg\{\Theta^H(1)\Theta(0)\},$$

wherein $i_1$ and $i_0$ are indexes and $\Theta^H(1)$ and Θ(0) are delay coefficients according to temporal intervals of observation windows of the partial sequences.

7. An arrangement for performing the process for demodulation according to claim 6, comprising:
   a storage device for storing present symbols of the partial sequences;
   a buffer storage device for storing symbols ($d_i$) transmitted in the received signal;
   a calculation circuit for determining coefficients h[0] and h[1] of at least two observation windows;
   a time delay element for delaying coefficients h[0] according to a temporal interval ($i_1-i_0$)T of the observation window, wherein T is symbol duration of the received signal; and
   a calculation circuit for calculating the frequency shift ξ.

8. A process for demodulation of a received signal that contains, besides data transmitted, a preset synchronization sequence, characterized in that, to estimate a frequency shift ξ,
   a) at least two nonoverlapping partial sequences ($d_{i0}$ to $d_{i0+N}$ and $d_{i1}$ to $d_{i1+N}$) of the synchronization sequence are picked off, b) using a least-square process, coefficients h[0], h[1] are determined for one channel step response in each case for both partial sequences ($d_{i0}$ to $d_{i0+N}$ and $d_{i1}$ to $d_{i1+N}$), and c) frequency shift $\xi$, in the form of phase rotation, is estimated as:

$$\xi = \frac{1}{i_1 - i_0} \arg\{R^H[1]R[0]\},$$

wherein $i_1$ and $i_0$ are indexes, R represents correlation coefficients and $R^H[1]$ represents a transposition and complex conjugate of R[1], coefficients h[0], h[1] are determined as:

$$h = R^*[1]\exp(-ji_1\xi)/K^*,$$

wherein K is represented as $$K = \frac{\exp(-j(N+1)\xi) - \exp(-jM\xi)}{\exp(-j\xi) - 1},$$

wherein N designates a length of both partial sequences and M designates a number of coefficients of the channel step response.

9. An arrangement for performing the process for demodulation according to claim 8, comprising:
- a storage device for storing preset symbols of the partial sequences;
- a buffer storage device for storing symbols ($d_i$) transmitted in the received signal;
- a calculation circuit for determining coefficients h[0] and h[1] of at least two observation windows;
- a time delay element for delaying coefficients h[0] according to a temporal interval ($i_1-i_0$)T of the observation window, wherein T is symbol duration of the received signal; and
- a calculation circuit for calculating the frequency shift $\xi$.

* * * * *